United States Patent
Ito et al.

(10) Patent No.: US 9,703,017 B2
(45) Date of Patent: Jul. 11, 2017

(54) OPTICAL LENS, LENS UNIT, IMAGING MODULE, ELECTRONIC DEVICE, OPTICAL LENS PRODUCTION METHOD, LENS MOLD, AND SHAPE CORRECTION METHOD FOR LENS MOLD

(71) Applicant: FUJIFILM Corporation, Tokyo (JP)

(72) Inventors: Hidekane Ito, Saitama (JP); Nariya Matsumoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/843,949

(22) Filed: Sep. 2, 2015

(65) Prior Publication Data
US 2015/0378066 A1 Dec. 31, 2015

Related U.S. Application Data

(63) Continuation of application No. PCT/JP2014/057886, filed on Mar. 20, 2014.

(30) Foreign Application Priority Data

Mar. 27, 2013 (JP) .................. 2013-067036

(51) Int. Cl.
*G02B 3/00* (2006.01)
*B29D 11/00* (2006.01)
(Continued)

(52) U.S. Cl.
CPC ...... *G02B 3/0075* (2013.01); *B29D 11/00019* (2013.01); *B29D 11/00336* (2013.01);
(Continued)

(58) Field of Classification Search
CPC ...... G02B 3/0012; G02B 3/0075; G02B 9/02; G02B 13/0025; G02B 3/0018;
(Continued)

(56) References Cited

U.S. PATENT DOCUMENTS 6,951,392 B2 10/2005 Jones
7,584,015 B2 9/2009 Ueno et al.
(Continued)

FOREIGN PATENT DOCUMENTS

CN 1819894 8/2006
CN 102088929 6/2011
(Continued)

OTHER PUBLICATIONS

"Office Action of China Counterpart Application" with English translation, issued on Jul. 29, 2016, p. 1-p. 12.
(Continued)

*Primary Examiner* — Jordan Schwartz
(74) *Attorney, Agent, or Firm* — Jianq Chyun IP Office

(57) ABSTRACT

An optical lens 11, which has a lens section with a refractive power, has concave marks 33, 35, 37, and 39 which are formed to be recessed on a surface of the lens section, in an effective optical lens surface which contributes to image forming of the lens section. A width of each of these concave marks 33, 35, 37, and 39 is equal to or greater than 0.05 µm and equal to or less than 14 µm, and a depth of recession of each concave mark is equal to or greater than 0.05 µm and equal to or less than 5 µm.

15 Claims, 16 Drawing Sheets

(51) Int. Cl.
  *G02B 3/08* (2006.01)
  *G02B 3/04* (2006.01)
  *B29K 101/00* (2006.01)

(52) U.S. Cl.
  CPC .. *B29D 11/00432* (2013.01); *B29D 11/00471* (2013.01); *B29D 11/00951* (2013.01); *G02B 3/04* (2013.01); *G02B 3/08* (2013.01); *B29K 2101/00* (2013.01); *B29K 2995/0026* (2013.01)

(58) Field of Classification Search
  CPC .......... G02B 3/0037; G02B 3/04; G02B 3/08; B29D 11/00326; B29D 11/00336; B29D 11/00019; B29D 11/00951
  See application file for complete search history.

(56) References Cited

U.S. PATENT DOCUMENTS

| | | | | |
|---|---|---|---|---|
| 2005/0182489 | A1* | 8/2005 | Peyman | A61F 2/16 351/159.78 |
| 2007/0273983 | A1* | 11/2007 | Hebert | G02B 5/1895 359/708 |
| 2011/0098808 | A1* | 4/2011 | Kobayashi | A61F 2/1613 623/6.11 |
| 2014/0151834 | A1* | 6/2014 | Samarao | G01J 5/045 257/432 |

FOREIGN PATENT DOCUMENTS

| JP | H08216272 | 8/1996 |
|---|---|---|
| JP | 2007519020 | 7/2007 |
| JP | 3973430 | 9/2007 |
| WO | 2005115712 | 12/2005 |

OTHER PUBLICATIONS

"International Search Report (Form PCT/ISA/210)", mailed on Jun. 10, 2014, with English translation thereof, pp. 1-5, in which one of the listed references (JP2007519020) was cited.

"Written Opinion of the International Searching Authority of PCT/JP2014/057886", this report contains the following items: Form PCT/ISA237(cover sheet), PCT/ISA237(Box No. I) and PCT/ISA237(Box No. V), mailed on Jun. 10, 2014, which is English translation of "Written Opinion of the International Searching Authority", pp. 1-7.

"Office Action of China Counterpart Application" with English translation thereof, issued on Mar. 6, 2017, p. 1-p. 16.

* cited by examiner

US 9,703,017 B2

OPTICAL LENS, LENS UNIT, IMAGING MODULE, ELECTRONIC DEVICE, OPTICAL LENS PRODUCTION METHOD, LENS MOLD, AND SHAPE CORRECTION METHOD FOR LENS MOLD

CROSS REFERENCE TO RELATED APPLICATIONS

This application is a Continuation of PCT International Application No. PCT/JP2014/057886 filed on Mar. 20, 2014, which claims priority under 35 U.S.C §119(a) to Japanese Patent Application No. 2013-067036 filed on Mar. 27, 2013, all of which are hereby expressly incorporated by reference into the present application.

BACKGROUND OF THE INVENTION

1. Field of the Invention

The present invention relates to an optical lens, a lens unit, an imaging module, an electronic device, an optical lens production method, a lens mold, and a shape correction method for the lens mold.

2. Description of the Related Art

Generally, when an optical lens as a molded article is produced using a lens mold produced on the basis of prescribed lens design values, a shape of the molded optical lens is not necessarily the same as that based on the lens design values. The reason for this is that the lens shape is affected by stress caused by a molding shape or shrinkage of the material itself in the course of cooling of the molded article. Accordingly, when an optical lens of which a shape is the same as that based on the lens design values is intended to be molded, the optical lens is molded using a lens mold, thereafter the shape of the molded optical lens is measured, and correction processing for making the lens mold have an appropriate shape on the basis of the measurement results is performed. For example, in the descriptions of JP1996-216272A (JP-H08-216272A) and JP3973430B, a marking is provided outside a lens effective portion of the lens mold, a surface shape of a molded lens article onto which the marking is transcribed is measured, shape errors, which are differences between design values and the measured values of the surface shape, are calculated, and the shape of the lens mold is corrected on the basis of the information about the shape errors.

In the description of WO2005/115712A, a molded lens article having a transcriptional mark onto which a marking is transcribed is tentatively molded using a lens mold for test with a marking having a concave shape, a curved lens surface shape is measured using the transcriptional mark of the molded lens article, correction information is calculated from the measured curved lens surface shape, and a lens mold actually used is produced again.

SUMMARY OF THE INVENTION

Recently, in most cases, aspheric lenses have been used in optical lenses. When a lens surface of a molded lens article is aspheric, an aspheric portion thereof is uneven or curved, and thus, in a cooling step in molding processing, the molded lens article shrinks irregularly. Hence, in order to accurately transcribe the aspheric shape of the lens mold onto the molded article, it is necessary to precisely detect a difference between the aspheric shape of the lens mold and the aspheric shape of the molded article and perform processing of correcting the lens mold if a difference is detected.

However, in the methods disclosed in JP1996-216272A (JP-H08-216272A) and JP3973430B, a marking is provided in an ineffective optical surface of a lens, and thus an amount of displacement in an effective optical surface of the lens cannot be directly calculated. Hence, it is not possible to accurately detect a shrinkage state of the lens, and it is difficult to perform processing of correcting the mold thereof.

In the method described in WO2005/115712A, even if a lens mold actually used is produced on the basis of correction information, a molded lens article, which is molded by the lens mold, may have a surface shape which is not the same as that in a design thereof. In a case of producing the lens mold actually used, contrary to a case of chucking a mold in a mold processing machine the same as that used to produce a lens mold for a test, another mold different from the mold for the test is newly chucked. Further, a tool different from a tool, by which the mold for the test is processed, may be used in the mold processing. Hence, regarding shape reproducibility of the mold, it cannot be said that it is possible to necessarily obtain an expected accuracy in a surface, due to change in various processing conditions such as an abrasion state, a type of tool, and accuracy in chucking of the mold processing machine. Furthermore, it is possible to produce a plurality of molds, and there is a disadvantage that a molding process is complicated.

The present invention has been made in view of the above-mentioned situation, and its object is to provide an optical lens, a lens unit, an imaging module, an electronic device, a lens mold, a shape correction method for the lens mold, and an optical lens production method capable of obtaining a lens surface shape the same as that in a design with high accuracy reliably without loss in lens performance and simplifying a molding process using the lens mold even when high accuracy is necessary for processing for an aspheric lens and the like.

The present invention adopts the following configurations.

(1) An optical lens including a lens section with a refractive power, in which a concave mark, which is formed to be recessed on a surface of the lens section, is provided in an effective optical lens surface which contributes to image forming of the lens section, in which a width of the concave mark is equal to or greater than 0.05 μm and equal to or less than 14 μm, and in which a depth of recession of the concave mark is equal to or greater than 0.05 μm and equal to or less than 5 μm.

(2) A lens unit in which at least one or more of the optical lenses are held by a lens holder.

(3) An imaging module including: the lens unit, and an imaging section that captures an image of a subject through the lens unit.

(4) An electronic device in which the imaging module is mounted.

(5) An optical lens production method for molding an optical lens by using a lens mold with a transcriptional surface having a lens shape, in which the lens mold has a convex transcriptional section which is formed to protrude from the transcriptional surface having the lens shape toward the outside, in which an optical lens, which has a concave mark recessed on a surface of the lens section in an effective optical lens surface contributing to image forming of the lens section, is molded by the convex transcriptional section, in which a width of the concave mark is equal to or greater than 0.05 μm and equal to or less than 14 μm, and in which a depth of recession of the concave mark is equal to or greater than 0.05 μm and equal to or less than 5 μm.

(6) The lens mold used in the optical lens production method.

(7) A shape correction method for the lens mold, the method including: molding an optical lens, which has the concave mark, by using the lens mold which is produced on the basis of lens shape design data indicating a prescribed lens surface shape; acquiring measured surface shape data, which indicates a lens surface shape of the optical lens, by detecting a position of the concave mark of the optical lens which is molded; acquiring differential data, which is for matching a surface shape of the optical lens with a surface shape based on the lens shape design data, by comparing the measured surface shape data with the lens shape design data; and producing the lens module on the basis of lens shape correction data which is obtained by correcting the lens shape design data on the basis of the differential data.

According to the present invention, it is possible to obtain a lens surface shape the same as that in a design with high accuracy reliably without loss in lens performance even when high accuracy is necessary for processing for an aspheric lens and the like. Further, it is possible to simplify the molding process using the lens mold.

BRIEF DESCRIPTION OF THE DRAWINGS

FIG. 1A is an explanatory view illustrating a situation in which the lens mold is closed, and FIG. 1B is an explanatory view illustrating a situation in which an optical lens is taken out when the lens mold is open.

DESCRIPTION OF THE PREFERRED EMBODIMENTS

Hereinafter, embodiments of the present invention will be described with reference to drawings.

Figure 1A:
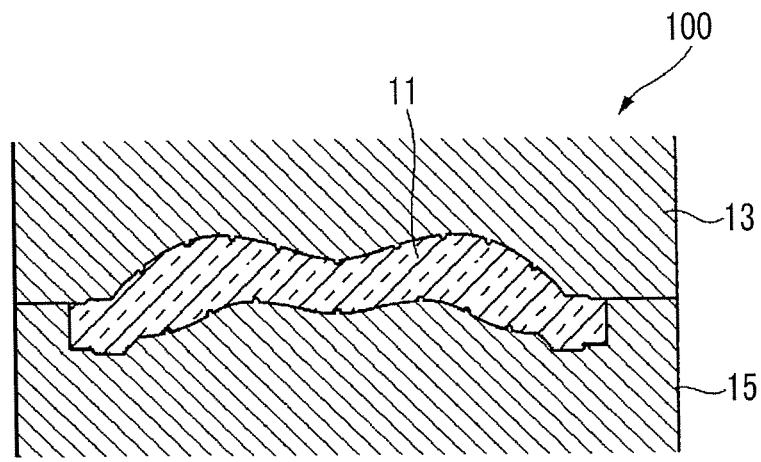
FIGS. 1A and 1B are sectional views illustrating an optical lens and a lens mold according to an embodiment of the present invention, where
Figure 1B:
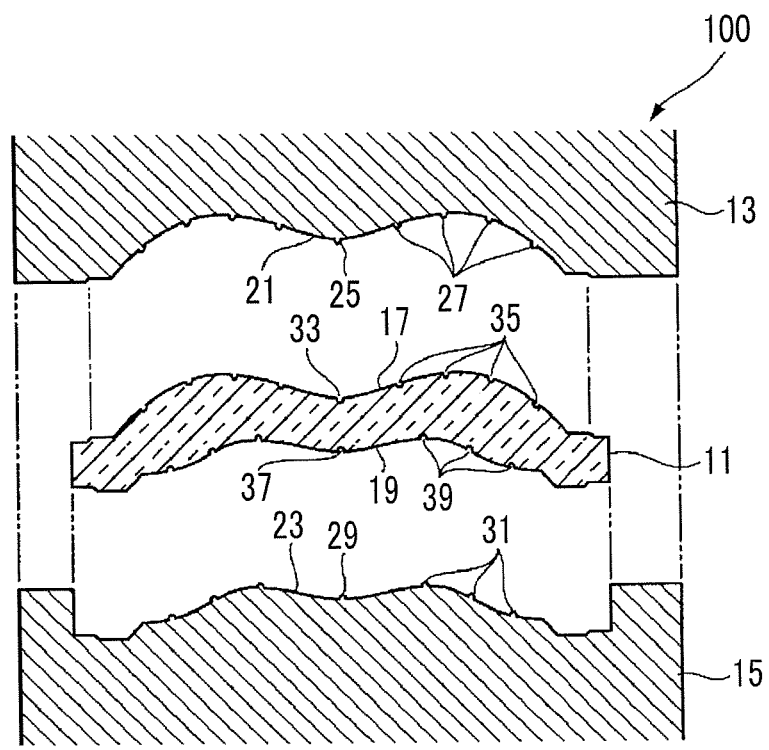

FIGS. 1A and 1B are sectional views illustrating an optical lens and a lens mold according to an embodiment of the present invention, where FIG. 1A is an explanatory view illustrating a situation in which the lens mold is closed, and FIG. 1B is an explanatory view illustrating a situation in which an optical lens is taken out when the lens mold is open.

As illustrated in FIG. 1A, a lens mold 100 has an upper mold 13 and a lower mold 15 for molding an optical lens 11 having a discoidal shape. The optical lens 11 is a meniscus lens of which a lens surface 17 on the upper side in the drawing and a lens surface 19 on the lower side are different from each other and which is made of transparent resin.

The upper mold 13 and the lower mold 15 illustrated in FIG. 1B respectively have a lens transcriptional section 21 that transcribes one lens surface 17 of the optical lens 11, and a lens transcriptional section 23 that transcribes the other lens surface 19 thereof.

In the lens transcriptional section 21 of the upper mold 13, a plurality of convex transcriptional sections 25 and 27 described later in detail is formed to protrude from the transcriptional surface to the outside. In the lens transcriptional section 23 of the lower mold 15, a plurality of convex transcriptional sections 29 and 31 described in detail is formed to protrude from the transcriptional surface to the outside. The plurality of convex transcriptional sections 25, 27, 29, and 31 forms and transcribes concave marks 33, 35, 37, and 39 to be described later on and onto the lens surfaces 17 and 19 of the optical lens 11.

<Shape of Optical Lens>

First, a shape of the optical lens 11 will be described.

Figure 2:
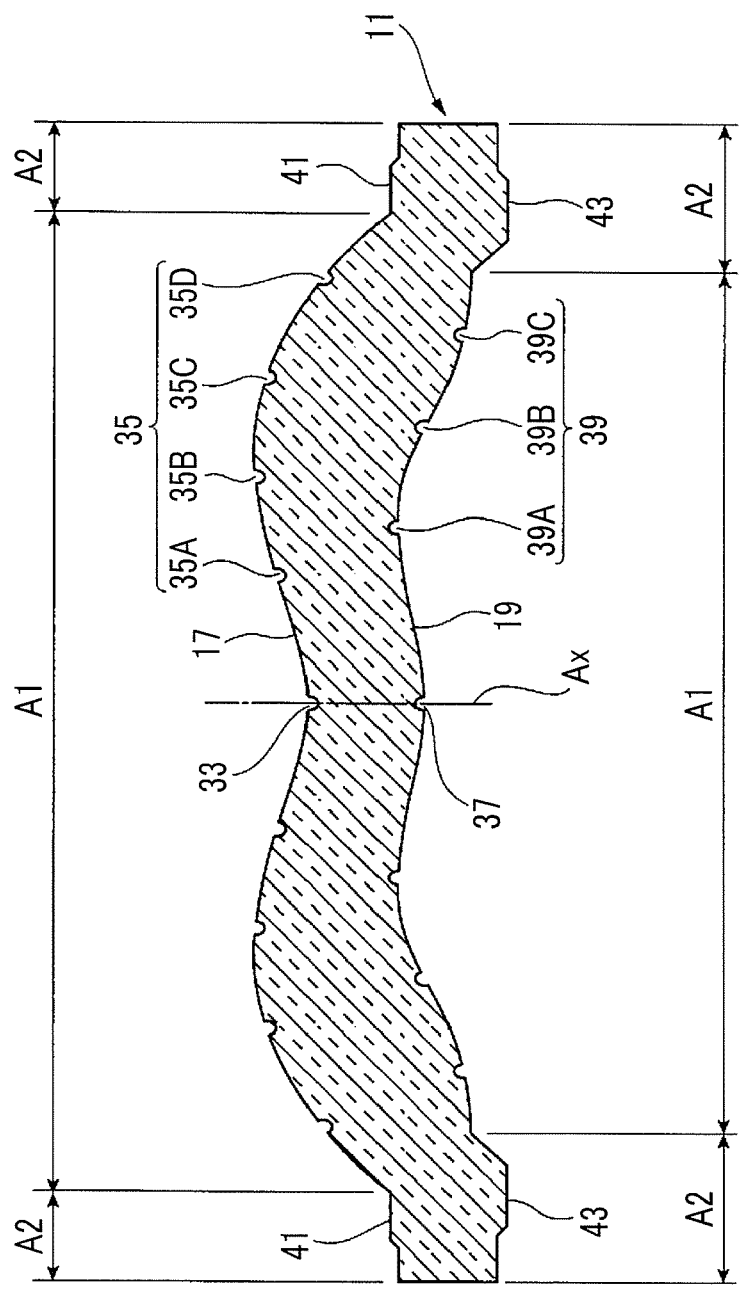
FIG. 2 is a sectional view of the optical lens.

FIG. 2 is a sectional view of the optical lens 11. Each of the lens surfaces 17 and 19 of the optical lens 11 has a lens section A1, which has a refractive power, and a lens peripheral section A2 which extends to the outer periphery of the lens section A1. The lens section A1 is an aspheric lens, and flat portions 41 and 43, through which the optical lens 11 is bonded to a lens holder or another lens, are formed in the lens peripheral section A2.

Figure 3:
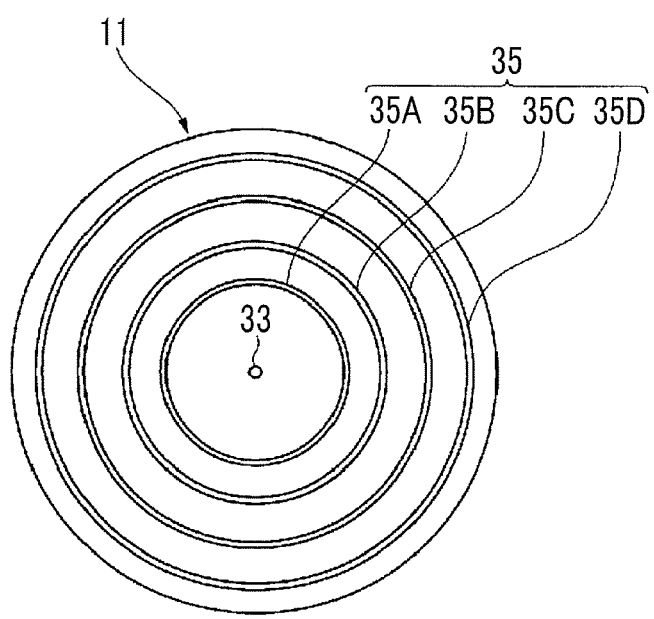
FIG. 3 is a plan view of the optical lens illustrating an arrangement pattern of concave marks.

FIG. 3 is a plan view of the optical lens illustrating an arrangement pattern of the concave marks 33 and 35. The lens surface 17 of the optical lens 11 has the concave mark 33, which is formed at a position of a lens optical axis Ax and has a point shape, and the concave marks 35 (35A, 35B, 35C, and 35D) which have a concentric shape centered on the concave mark 33 and are formed as a plurality of continuous grooves.

Likewise, the lens surface 19 of the optical lens 11 has the concave mark 37, which is formed at a position of the lens optical axis Ax, and the concave marks 39 (39A, 39B, and 39C) which have a concentric shape centered on the concave mark 37 and are formed as a plurality of continuous grooves.

These concave marks 33, 35, 37, and 39 are formed to be recessed from the lens surfaces 17 and 19, in the effective optical lens surface of the lens section A1 of the optical lens 11. Each of the concave marks 33, 35, 37, and 39 is a mark for measuring whether or not a lens shape of the optical lens 11 in the lens section A1 coincides with shapes of the lens transcriptional sections 21 and 23 of the lens mold 100 which is produced on the basis of prescribed lens shape design data. On the basis of measurement results obtained from measurement of positions of these concave marks 33, 35, 37, and 39, the shapes of the lens transcriptional sections 21 and 23 of the lens mold 100 are processed to be corrected.

Figure 4:
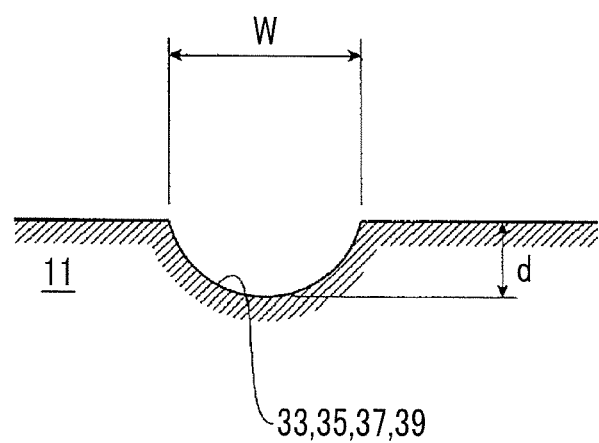
FIG. 4 is a sectional view illustrating a sectional shape of the concave mark.

FIG. 4 illustrates a sectional shape of the concave mark. In the sectional shape of each of the concave marks 33, 35, 37, and 39, if a diameter D of the lens section A1 of the optical lens 11 is set in a range of 1.5 mm to 4 mm, a width W of a groove in a radial direction from the lens optical axis toward the lens outer periphery is equal to or greater than 0.05 μm and equal to or less than 14 μm. Further, a depth d of the groove is equal to or greater than 0.05 μm and equal to or less than 5 μm. In addition, a ratio of a total area of the concave mark within the effective optical lens surface of the lens section A1 to an area of the effective optical lens surface is equal to or less than 1.2%. The effective optical lens surface described herein means a lens area through which light contributing to generation of an image captured by an imaging device (refer to FIG. 15) to be described later is transmitted. If the width W and the depth d of the groove are less than 0.05 μm, accuracy in detection of grooves performed by a shape measurement device to be described later is lowered. Hence, it is preferable that each of those is set to be equal to or greater than 0.05 μm. Furthermore, if the depth d of the groove is greater than 5 μm, a diffraction intensity of incident light increases, and local diffraction is caused by the grooves, whereby an amount of light traveling toward the imaging device decreases. As a result, this causes deterioration in image quality of the captured image, and thus it is preferable that the depth d of the groove is equal to or less than 5 μM.

Sizes of the concave marks or a total area of the concave marks, which are arranged on the effective optical lens surface of the lens section A1, are set in the above-mentioned range, whereby this setting has almost no influence on lens performance of the lens section A1. According to the Bragg equation ($\sin \theta = \lambda/\delta$: θ is an angle of diffraction, and X is a wavelength of light), if an interval δ between the adjacent concave marks is sufficiently large, the angle of diffraction θ is approximately 0. Hence, diffraction does not actually occur in the ranges of dimensions of the concave marks, and undesired light having influence on image capturing of the lens does not occur.

Under these conditions for the total area of the concave marks arranged and the ranges of dimensions of the concave marks, a value of a modulation transfer function (MTF), which indicates a lens resolution of the lens section A1, does not drastically decrease. Specifically, when the width W and the depth d of the groove are set in the above-mentioned ranges, as compared with the value of MTF for a lens section which has the same configuration as that of the lens section except that the concave marks are not formed, a rate of the decrease from the value of the MTF in the case of not forming the concave marks is within 5%. If the decrease ratio of the MTF is within 5%, even when the concave marks are disposed in the effective optical lens surface contributing to image capturing of the lens section A1, the concave marks have almost no influence on resolving power of an actual lens.

The concave marks 33 and 37 are provided on the lens optical axis Ax. This configuration is preferable since it becomes easy to detect change in rotationally symmetric lens shape. However, the concave marks 33 and 37 do not have to be provided on the lens optical axis Ax. In this case, it is possible to calculate a position of the lens optical axis Ax from the other concave marks 35 and 39.

The concave marks 35 and 39 are formed in a concentric shape. Thereby, each one concave mark is disposed on each of the lines which are equidistant from the lens optical axis Ax when the lens optical axis Ax is set as a center of the lines. Hence, it becomes easy to calculate an amount of shrinkage of the lens, and it becomes easy to perform correction of a shape of a mold to be described later.

<Procedure of Production of Lens Mold and Molding of Optical Lens>

Next, a procedure of production of the lens mold, which is for molding the optical lens 11, and molding of the optical lens performed by the lens mold will be described.

Figure 5:
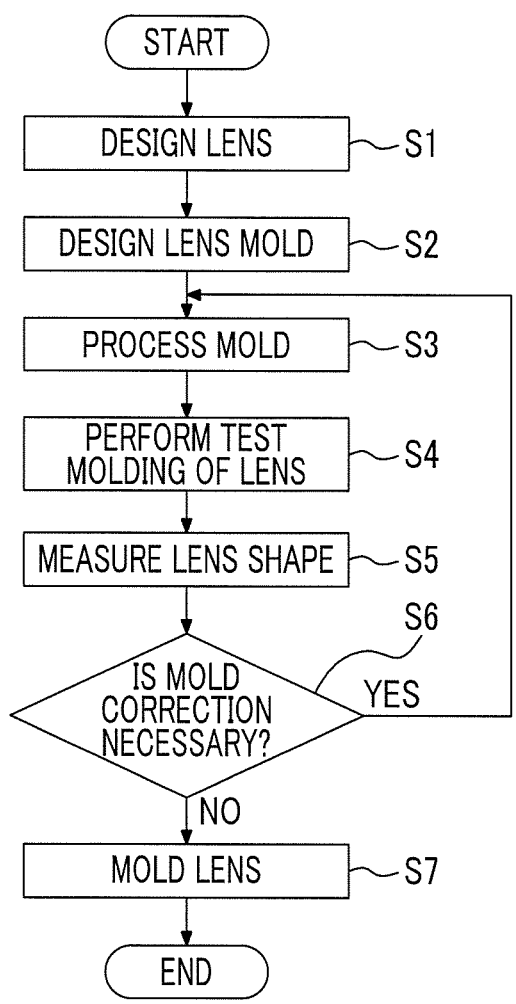
FIG. 5 is a flowchart illustrating a procedure of production of the lens molds and molding of the optical lens.

FIG. 5 is a flowchart illustrating a procedure of production of the lens mold and molding of the optical lens.

For molding the optical lens 11, first, a lens design for obtaining desired optical performance is performed, and a lens shape thereof is determined (S1). Next, each shape of the lens molds for molding the determined lens shape is determined (S2).

Figure 6:
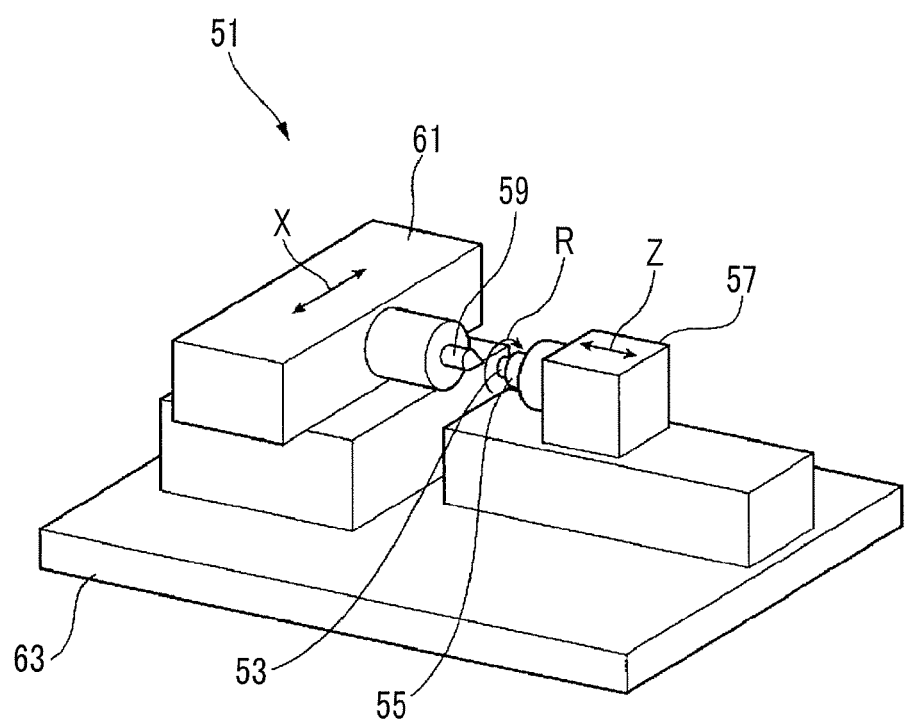
FIG. 6 is a configuration diagram of an example of a die machining apparatus.

Then, an upper mold 13 and a lower mold 15 of the lens mold 100 are processed to have the designed shapes (S3). At the time of producing the upper mold 13 and the lower mold 15, for example, a die machining apparatus 51 illustrated in FIG. 6 is used. The die machining apparatus 51 mainly has a headstock 57 and a reciprocating stage 61. The headstock 57 is driven to rotate in an R direction in a state where a workpiece 53 as a raw material of the upper mold 13 or the lower mold 15 is chucked by a chuck 55. The reciprocating stage 61 is movable in a radial direction (x direction) of rotation of the workpiece 53 in a state where the tool 59 is fixed onto the stage. The headstock 57 is movable in the forward and backward direction (z direction) relative to the tool 59, and the headstock 57 and the reciprocating stage 61 are provided on a common base 63.

The workpiece 53 is chucked by the chuck 55 of the die machining apparatus 51, and the workpiece 53 is driven to rotate. Then, a tip of the tool 59 cuts the workpiece 53 by moving the headstock 57 in the z direction, and the tool 59 is moved by moving the reciprocating stage 61 in the x direction.

Figure 7:
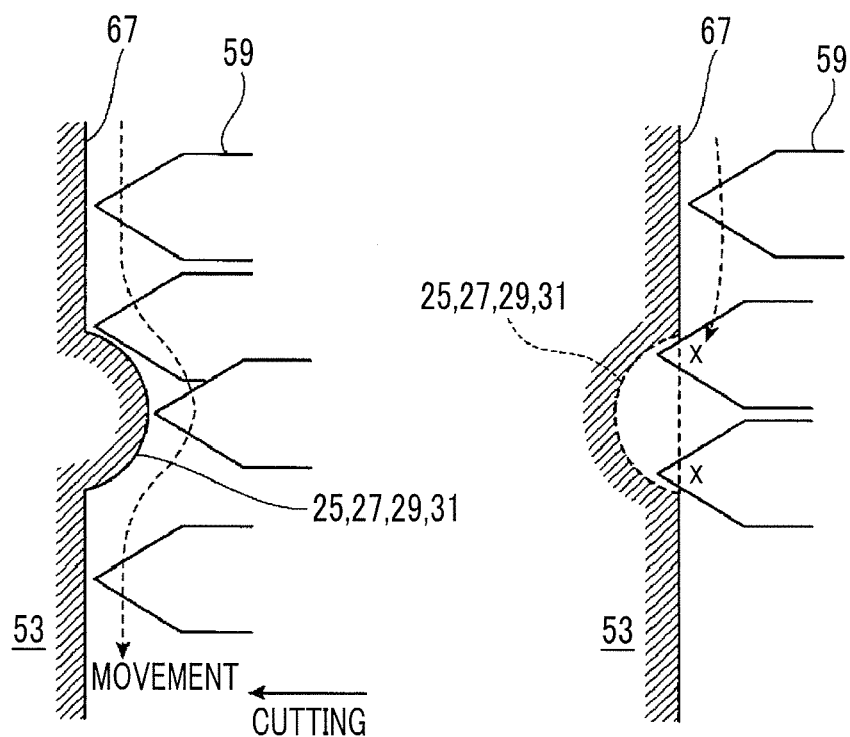
FIGS. 7A and 7B are process explanatory diagrams illustrating situations of processing for work pieces.

Situations of processing of the workpiece 53 at this time are schematically illustrated in FIGS. 7A and 7B. When the workpiece 53 is cut by the tool 59, as illustrated in FIG. 7A, the tool 59 moves back and forth in a cutting direction along a desired lens shape while moving the tool 59 along an end face 67 of the workpiece 53. Then, the tool 59 moves back and forth in the cutting direction along the shape of convex transcriptional sections 25, 27, 29, and 31, at positions of the convex transcriptional sections 25, 27, 29, and 31 protruding from the end face 67 in the lens shape. Here, in the case where the transcriptional sections 25, 27, 29, and 31 have convex shapes, the convex shapes of the convex transcriptional sections 25, 27, 29, and 31 are easily processed by the tip of the tool 59. However, conversely, in a case where the transcriptional sections have concave shapes, a problem arises.

Referring to FIG. 7B, the case where the concave is cut by the tool will be described. If a cutting edge of the tip of the tool 59 for cutting the workpiece 53 is too thick relative to the concave to be formed, it is not possible to accurately perform processing of the concave. That is, when a desired concave is intended to be formed on the surface of the workpiece 53, if the tip of the tool 59 is too thick relative to the concave, it is not possible to apply the cutting edge of the tip of the tool 59 to the cutting point. As a result, even if cutting is performed by moving the tool 59 along the desired concave, the formed concave does not coincide with a desired shape. Generally, even though a width of the edge of the tip of the tool 59 is infinitesimal, the width is at least about 1 μm, and thus it is not possible to process a groove of which a width is narrower than a width of the edge.

Hence, when processing is intended to be performed on the workpiece 53, in view of performing finer processing, it is more advantageous to form a concave portion on the workpiece 53 side. In this configuration, the convex transcriptional sections 25, 27, 29, and 31 having convex shapes are formed on the lens transcriptional sections 21 and 23 of the upper mold 13 and the lower mold 15. Hence, it is possible to easily form the transcriptional sections of which protrusions have extremely small widths.

Next, test molding of an optical lens is performed using the upper mold 13 and the lower mold 15 which are produced by forming the convex transcriptional sections having convex shapes and forming a desired lens shape on the workpiece 53 as described above (S4).

In the test molding, as illustrated in FIGS. 1A and 1B mentioned above, a cavity between the upper mold 13 and the lower mold 15 produced is supplied with transparent resin, and the lens transcriptional section 21 of the upper mold 13 and the lens transcriptional section 23 of the lower mold 15 transcribe the lens shape and the convex transcriptional sections 25, 27, 29, and 31 onto the transparent resin. Thereby, the optical lens 11, in which the lens section having a desired shape and the concave marks 33, 35, 37, and 39 are formed on the effective optical lens surface contributing to image capturing of the lens section, is obtained.

Then, the optical lens 11 obtained by the test molding is fixed onto a shape measurement device for measuring a lens shape, and a 3-dimensional shape of the lens section is measured (S5). As the shape measurement device, for example, it is possible to use a UA3P produced by Panasonic Co., but the shape measurement device is not particularly limited.

Figure 8:
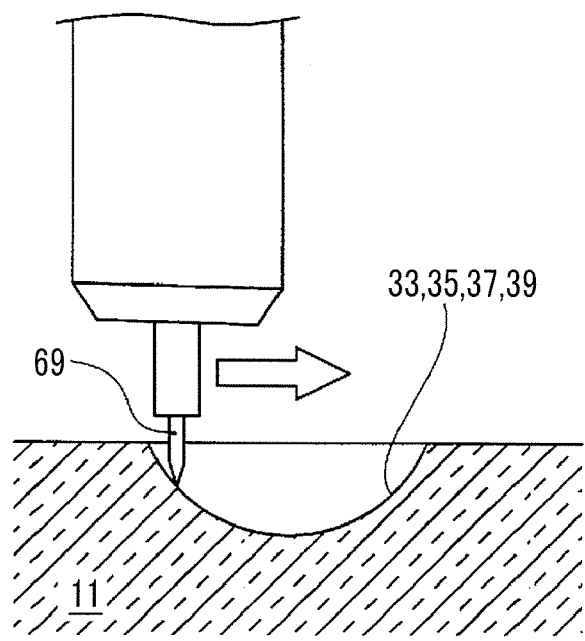
FIG. 8 is an explanatory diagram schematically illustrating a situation in which a shape of a lens section is measured by a shape measurement device.

FIG. 8 schematically illustrates a situation in which a shape of the lens section is measured by the shape measurement device.

The shape measurement device scans a surface of the optical lens 11 by bringing a stylus pin 69 as the tip into contact with the surface, and detects a curved surface shape by amplifying displacement information obtained from the stylus pin 69.

Figure 9:
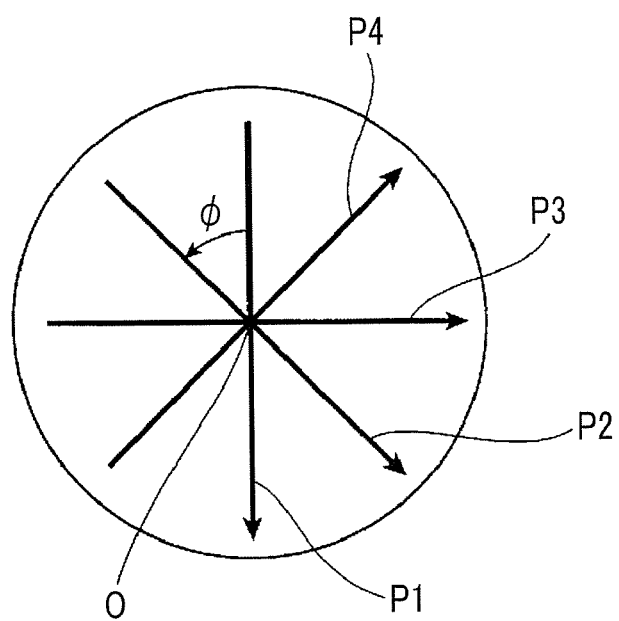
FIG. 9 is an explanatory diagram schematically illustrating a method of scanning the optical lens with a stylus pin.

FIG. 9 schematically illustrates a method of scanning the optical lens with the stylus pin.

Relative scanning between the optical lens 11 and the stylus pin 69 may be performed, for example, by a scanning method in which scanning along a diameter direction passing through a lens center O is repeated for each of a plurality of rotation angles φ. That is, after scanning is performed in a P1 direction along the diameter direction, scanning is performed in a P2 direction which is rotated by a rotation angle φ from the P1 direction, and is performed in a P3 direction which is rotated by a rotation angle φ from the P2 direction. As the rotation angle φ becomes infinitesimal, the number of components intersecting with the concave marks increases, and thus it is possible to increase accuracy in shape measurement of the lens. In addition, relative movement between the stylus pin and the optical lens 11 may mean that either one thereof moves relative to the other one, and may mean that, for example, the optical lens 11 moves on a horizontal plane and the stylus pin is fixed relative to the horizontal plane and is movable in a vertical direction in accordance with the lens shape.

The shape measurement device performs shape measurement on the lens section of the optical lens 11, and acquires measured surface shape data which includes position data (rotation angles φ, and radii r) and height data (heights h at the rotation angles φ and the radii r) of the detected concave marks 33, 35, 37, and 39 of the optical lens 11. According to measured surface shape data which is obtained, it is possible to detect the heights h at the detection positions φ and r of the concave marks, and it is possible to calculate heights by interpolating for positions other than positions of the arranged concave marks from the measurement data of surrounding concave marks. Hence, on the basis of the measured surface shape data, it is possible to detect the 3-dimensional shape of the entire lens section of the optical lens 11.

Next, the obtained measured surface shape data is compared with lens shape design data which is used as a basis of production of the lens mold. The shape of the optical lens 11 subjected to the test molding does not coincide with a shape based on the prescribed lens shape design data, due to stress caused by a molding shape or shrinkage of the material itself in the course of cooling of the molded article. Then, differential data for making the surface shape of the optical lens 11, which is subjected to the test molding, coincide with the surface shape based on the lens shape design data is acquired.

The optical lens 11 has a shape which is rotationally symmetric about the lens optical axis Ax. However, for example, on the basis of a gate mark remaining on the optical lens surface at a gate connection position at the time of lens molding, corresponding positions between the optical lens 11 and the lens mold at the time of rotation about the lens optical axis Ax are calculated. Thereby, it is possible to uniquely determine the corresponding positions between the optical lens 11 and the lens mold.

Then, using the differential data, it is determined whether the difference between the measured surface shape data and the lens shape design data is equal to or greater than a predetermined value (S6). If the difference between both of those is equal to or greater than the predetermined value, the lens mold is reprocessed until the difference is less than the value (steps S3 to S5 are repeated). In this case, the lens mold is reproduced on the basis of the lens shape correction data which is obtained by correcting the prescribed lens shape design data on the basis of the differential data.

If the difference is less than the predetermined value, directly using the lens mold used in the test molding, the optical lens 11 is molded (S7).

According to a shape correction method for the lens mold and a method of molding the optical lens, after the shape of the lens mold is corrected, the lens shape of the optical lens, which is subjected to the test molding by using the lens forming mold, is measured, and it is checked that the difference between the measured surface shape data and the lens shape design data is less than the predetermined value. Thereafter, the optical lens 11 is molded using the lens mold on which the shape correction and the checking of the difference are completed. Hence, the lens shape of the optical lens 11 finally obtained can be checked using the test molding, and it is possible to reliably obtain a lens shape the same as the shape based on the lens shape design data.

Generally, if a shape of the lens section is an aspheric shape, there is no reference for an aspheric surface portion, and thus it is not detected how much a certain site shrinks in a certain direction. Hence, it is difficult to detect correspondence regarding which site of the lens mold corresponds to which site of the optical lens. However, in a case of this configuration, the concave marks, which are transcribed by the convex transcriptional sections of the lens mold, are formed in the effective optical surface of the optical lens. Hence, it is possible to accurately detect the corresponding positions between the lens mold and the optical lens. Accordingly, by measuring the aspheric shape of the molded optical lens, it is possible to accurately detect how much the shape of the lens mold is corrected at a position of the lens mold when feedback of the shape is performed, and thus it is possible to correct the lens mold with high accuracy. Accordingly, it is possible to performing molding such that the shape of the optical lens is the same as the shape based on the lens shape design data, with high accuracy.

In particular, if a lens diameter of an aspheric lens for which high resolution is necessary is for example about 1 mm, it is necessary to achieve a stringent target shape accuracy, at which the shape error is equal to or less than 0.1 μm, and the like. Even if such high accuracy molding is necessary, according to this method, it is possible to stably mold the optical lens with the target shape accuracy at low cost while maintaining high resolution.

The optical lens 11 finally obtained is molded by the lens mold for which it is checked that the shape of the optical lens subjected to the test molding coincides with that based on the lens shape design data at a level causing no problem, after the lens mold is corrected. Accordingly, compared with a case where final correction data is acquired and the lens mold is reproduced, reliability of the lens shape is high.

In the optical lens 11 finally obtained, the concave marks 33, 35, 37, and 39, which are transcribed onto the optical lens subjected to the test molding, still remain as they are. However, sizes of these concave marks 33, 35, 37, and 39 are small, and have almost no influence on the optical performance of the lens even if the marks remain in the effective optical range of the optical lens 11. Further, the concave marks remaining in the optical lens 11 can be used in traceability for product quality. For example, when optical lenses are continuously molded by a lens transcriptional mold of which a shape is corrected, there may be a problem in shapes and properties of the lenses. In this case, the lens shapes of the molded optical lenses are respectively measured using the concave marks, whereby it is possible to check for occurrence of troubles in accordance with the elapse of time.

<Modification Examples of Concave Marks (Convex-Shaped Transcriptional Sections)>

Next, modification examples of the concave marks (convex transcriptional sections of the lens mold) of the optical lens 11 will be described.

(Sectional Shapes of Concave Marks)

Figure 10A:
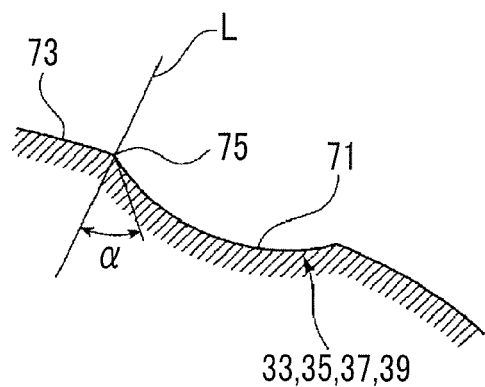
FIGS. 10A to 10C are sectional views of various concave marks.
Figure 10B:
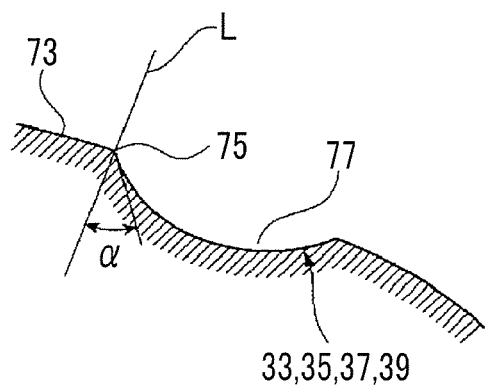
Figure 10C:
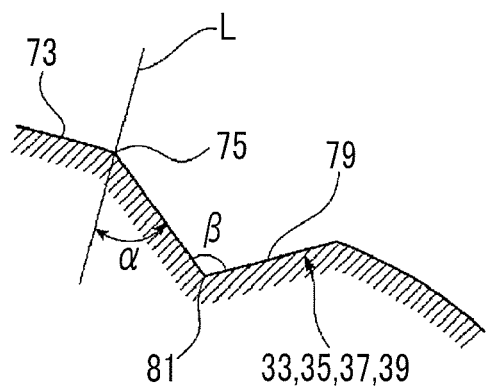

The concave surface shapes of the concave marks 33, 35, 37, and 39 may be modified into various shapes. FIGS. 10A to 10C are sectional views of various concave marks. A concave surface of a concave mark 71 illustrated in FIG. 10A is aspheric, and an inclination angle α of the lens inside to a line L normal to the lens surface at the boundary between the mark and the lens surface 73 is equal to or greater than 40° and equal or less than 80°. By making the concave surface aspheric, it is possible to define a width of the concave mark in a wider range than that in a case of making the concave surface spherical. Hence, when scanning is performed by bringing the stylus pin 69 of the shape measurement device illustrated in FIG. 8, it is possible to make a measurement distance longer than that in the case of the spherical surface, and thus it is easy to acquire a center position of the concave mark 71.

A concave surface of a concave mark 77 illustrated in FIG. 10B is spherical, and the inclination angle α to the line L normal to the lens surface is equal to or greater than 40° and equal or less than 80°. Further, a concave surface of a concave mark 79 illustrated in FIG. 10C is angular in section, and the inclination angle α to the line L normal to the lens surface is equal to or greater than 40° and equal or less than 80°. Furthermore, it is preferable that an opening angle β of a bottom 81 is obtuse, in view of smoothly scanning the stylus pin 69. Since the concave surface is angular in section, it is possible to easily detect a center position of the concave mark 79 as the bottom 81.

(Arrangement Pattern of Concave Marks on Optical Lens)

Figure 11:
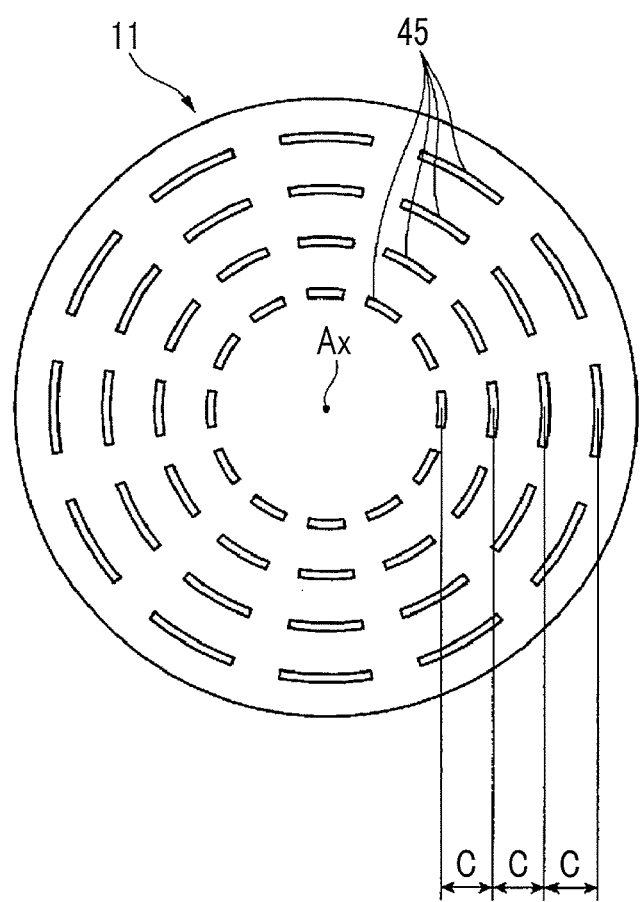
FIG. 11 is a plan view of the optical lens illustrating another arrangement pattern of concave marks.

FIG. 11 is a plan view of the optical lens illustrating another arrangement pattern of the concave marks. The concave marks may be not only continuous marks centered on the lens optical axis Ax but also discontinuous concave marks 45 which are disposed to be distributed. The concave marks 45 in this case are formed along circumferences of a plurality of concentric circles centered on the lens optical axis Ax, and the concave marks are segmentalized by providing spacing for each of prescribed central angles. It is preferable that the segmental patterns of the concentric circles are the same. In this case, it is possible to detect the concave marks 45 on all the concentric circles by performing scanning along a radial direction, which passes through the lens optical axis Ax and in which the concave marks 45 are present, with the stylus pin of the shape measurement device.

By segmentalizing the concave marks 45, it is possible to reduce a total area of the arranged concave marks 45. Hence, if the arranged concave marks 45 have the same total area, an arrangement pattern thereof can be made with higher density such that intervals C between concave mark groups, each of which has concave marks at the same radius from the center of the lens, are narrower. As a result, it is possible to improve accuracy in measurement of the lens shape.

That is, the concave marks may be formed along simple closed curves that enclose the lens optical axis Ax of the lens section. For example, the concave mark may be a mark which has an annular shape such as a polygonal shape or an elliptical shape in plan view from the direction of the lens optical axis Ax. Since the concave mark is a simple closed curve, when scanning is performed in an arbitrary radial direction passing through the lens optical axis Ax with the stylus pin of the shape measurement device, the stylus pin is inevitably fit in a certain portion of the concave mark. Hence, it is possible to reliably acquire a shape of the lens section around the lens optical axis Ax.

In a relative scanning method of the stylus pin illustrated in FIG. 9, the concave marks are disposed to have a concentric shape on the optical lens. However, the scanning method of the stylus pin may be changed, and may be applied to the following arrangement pattern of the concave marks.

Figure 12:
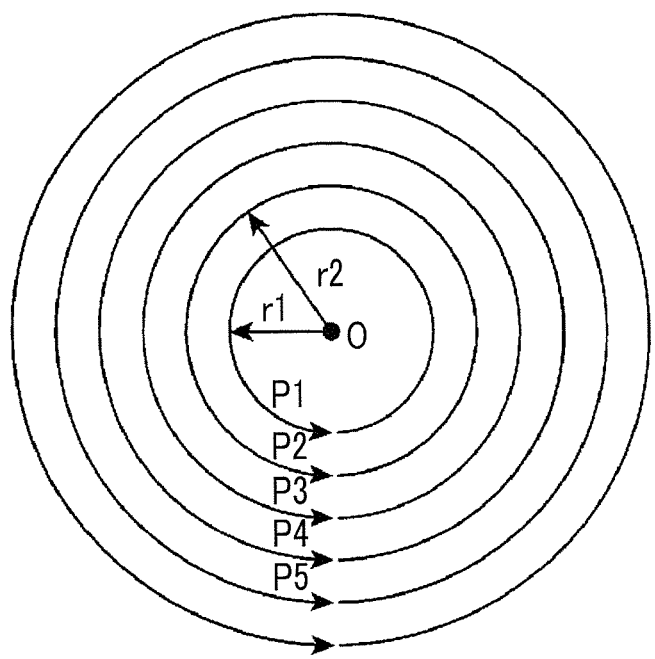
FIG. 12 is an explanatory diagram schematically illustrating another method of scanning the optical lens with the stylus pin.
Figure 13:
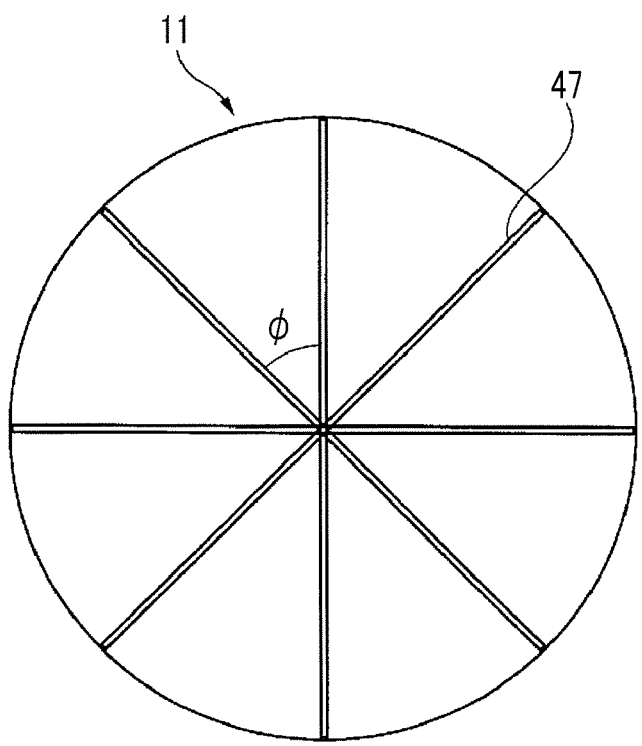
FIG. 13 is a plan view illustrating concave marks which extend radially.

FIG. 12 schematically illustrate another method of scanning the optical lens with the stylus pin. In a scanning method of FIG. 12, scanning operations of P1 to P5 are performed along circumferences of a plurality of concentric circles centered on the lens center O. In the case of this scanning method, as illustrated in FIG. 13, concave marks 47, which extend radially from the center of the optical lens 11, can be used. If the above-mentioned shape measurement device (FIG. 8) defines the center of the lens as an intersection of the concave marks 47 and the shape measurement device accurately controls radii r1, r2, . . . (FIG. 12) at which the scanning operations are performed with the stylus pin 69, it is possible to measure the lens shape in a manner similar to that of the above-mentioned concave marks illustrated in FIG. 3. In addition, as the rotation angle φ becomes infinitesimal, the number of components intersecting with the concave marks increases, and thus it is possible to increase accuracy in shape measurement of the lens.

(Another Optical Lens)

Figure 14:
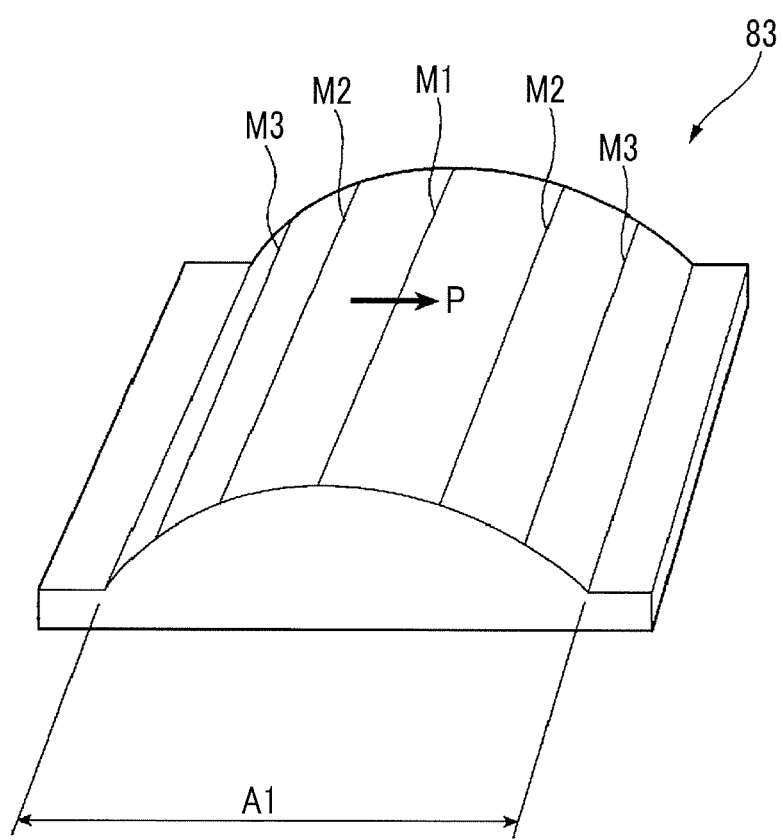
FIG. 14 is a perspective view illustrating a cylindrical lens as an optical lens.

In the above description, the aspheric meniscus lens having a discoidal shape is used as the optical lens, but the optical lens is not limited to this. For example, the optical lens may be not only a meniscus lens but also may be a convex lens, a concave lens, or a spherical surface lens. Further, the optical lens may be a cylindrical lens 83 illustrated in FIG. 14. When the cylindrical lens 83 is used, concave marks are respectively formed along segments M1, M2, and M3. The segment M1 is at a position of the lens optical axis of the lens section A1 of the cylindrical lens 83. The segments M2 and M2 are equidistant from the segment M1, and the segments M3 and M3 are equidistant from the segment M1, and parallel to the segment M1. Since positions of the segments M2 and M3 are symmetric to the segment M1, the concave marks are symmetrically disposed along the lines which are equidistant from the lens optical axis when the optical axis is set as the center of the lines. Therefore, by scanning on the concave marks at the positions of the segments M1, M2, and M3 along a P direction orthogonal to the concave marks with the stylus pin 69 of the shape measurement device, it is possible to measure the lens shape of the cylindrical lens 83. In addition, it may be possible to adopt a configuration in which the direction of arrangement of the concave marks and the direction of scanning of the stylus pin 69 are reversed.

It should be noted that, in the above-mentioned modification examples of the concave marks, the shapes of the convex transcriptional sections of the lens mold are the same, but the description will be omitted herein.

Figure 15:
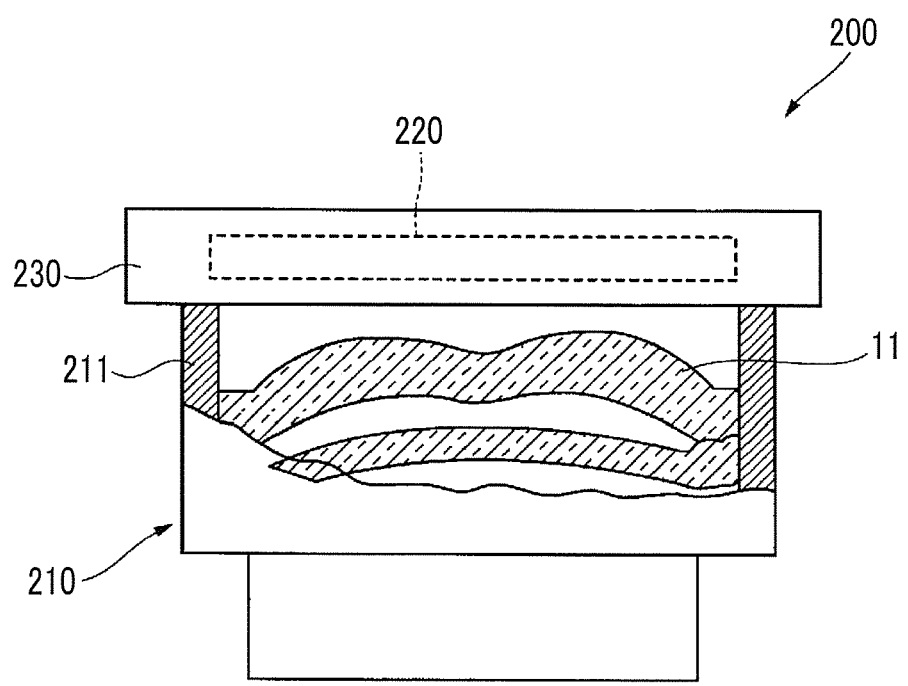
FIG. 15 is a configuration diagram illustrating an imaging module.

The optical lens 11 can be used in, for example, an imaging module illustrated in FIG. 15. The imaging module 200 has a lens unit 210, and an imaging section 230 including an imaging device 220 that captures an image of a subject through the lens unit 210. The lens unit 210 has a lens holder 211 and at least one optical lens 11 which is held by the lens holder 211. The optical lens 11 held by the lens holder 211 concentrates light from the subject side on the lower side in the drawing onto the imaging section 230 on the upper side in the drawing. The imaging section 230 captures an optical image of the subject so as to output a captured image signal.

The imaging module 200 is disposed in a casing of an electronic device such as a digital camera or an on-board camera which is supported by a supporting member such as a substrate which is not illustrated, and is provided as an imaging device. Other examples of the devices, into which the imaging module 200 is built, include electronic devices such as built-in or externally-mounted cameras for a personal computer (PC), camera-equipped interphones, on-board cameras, and portable terminal devices having a photography function. Examples of the portable terminal devices include mobile phones, smartphones, personal digital assistants (PDA), portable game machines, and the like.

As described above, the present invention is not limited to the embodiments. It is apparent that the configurations of the embodiments may be combined, or may be modified and applied by those skilled in the art on the basis of description of the specification and a known technology. The combinations, modifications, and applications thereof are within the encompassed scope of the present invention.

EXAMPLES

Regarding influence of the size of the concave mark on resolution of the lens, Table 1 collectively shows results of measurement which is performed by changing the depth d of the groove and the width W of the groove of the concave mark. In Examples 1 to 4 and Comparative Examples 1 and 2, as the concave marks, there are provided: a first groove that is formed at a position of the lens optical axis; a second groove of which the radius from the lens optical axis to the inside of the groove is 0.25 mm; a third groove of which the radius is 0.50 mm; a fourth groove of which the radius is 0.75 mm; a fifth groove of which the radius is 1.00 mm; and a sixth groove of which the radius is 1.25 mm.

Figure 16:
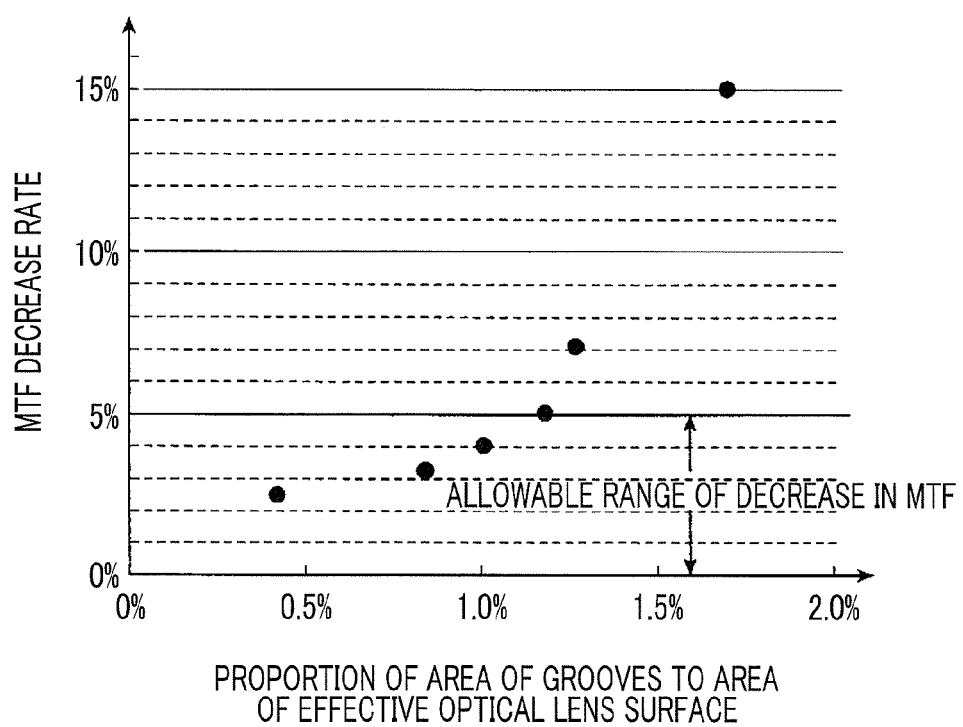
FIG. 16 is a graph illustrating a relationship between an MTF decrease ratio and a ratio of an area of grooves of the concave marks to an area of an effective optical lens surface.

In measurement of MTF, like the imaging module illustrated in FIG. 15, an imaging module houses five optical lenses. The measurement was performed on an imaging module in which the concave marks were formed on only the optical lens closest to the subject, and the measurement was performed on an imaging module in which the concave marks were not formed. The MTF decrease ratio is a value that indicates how much an MTF value of measurement of the imaging module having concave marks becomes lower than an MTF value of measurement of the imaging module having no concave marks. FIG. 16 is a graph illustrating a relationship between the MTF decrease ratio and a ratio of an area of the grooves of the concave marks to an area of the effective optical lens surface. For the measurement of MTF, a measurement device produced by Tri-Optics Co. was used.

In a manner similar to those of Examples 1 to 4, the width of the groove was in a range of 5 to 14 μm, the depth d of the groove was 5 μm, and a ratio of a total area of the grooves of the concave marks within the effective optical lens surface to an area of the effective optical lens surface was equal to or less than 1.2%. In this case, the accuracy in measurement of the MTF value was equal to or less than 5%. In these cases of Examples 1 to 4, effects on actual lens resolution are scarcely shown. However, in Comparative Example 1 in which the width of the groove was 15 μm and Comparative Example 2 in which the width thereof was 20 μm, the ratio of the grooves of the concave marks was greater than 1.2%, and the MTF decrease ratio was greater than 5%. In these cases of Comparative Examples 1 and 2, deterioration in lens resolution was at a non-negligible level.

TABLE 1

| No. | Effective lens diameter (radius) mm | Width of groove μm | Depth of groove μm | Inside radius of first groove mm | Inside radius of second groove mm | Inside radius of third groove mm | Inside radius of fourth groove mm | Inside radius of fifth groove mm | Inside radius of sixth groove mm | Total area of grooves mm$^2$ | Total area of grooves/ effective lens area % | Mtf decrease ratio % |
|---|---|---|---|---|---|---|---|---|---|---|---|---|
| Example 1 | 1.5 | 5 | 5 | 0 | 0.25 | 0.5 | 0.75 | 1 | 1.25 | 0.030 | 0.4 | 2.5 |
| Example 2 | 1.5 | 10 | 5 | 0 | 0.25 | 0.5 | 0.75 | 1 | 1.25 | 0.059 | 0.8 | 3.2 |
| Example 3 | 1.5 | 12 | 5 | 0 | 0.25 | 0.5 | 0.75 | 1 | 1.25 | 0.071 | 1.0 | 4.0 |
| Example 4 | 1.5 | 14 | 5 | 0 | 0.25 | 0.5 | 0.75 | 1 | 1.25 | 0.083 | 1.2 | 5.0 |
| Comparative example 1 | 1.5 | 15 | 5 | 0 | 0.25 | 0.5 | 0.75 | 1 | 1.25 | 0.089 | 1.3 | 7.0 |
| Comparative example 2 | 1.5 | 20 | 5 | 0 | 0.25 | 0.5 | 0.75 | 1 | 1.25 | 0.120 | 1.7 | 15.0 |

As described above, the present specification discloses the following items.

(1) An optical lens including a lens section with a refractive power, in which a concave mark, which is formed to be recessed on a surface of the lens section, is provided in an effective optical lens surface which contributes to image forming of the lens section, in which a width of the concave mark is equal to or greater than 0.05 µm and equal to or less than 14 µm, and in which a depth of recession of the concave mark is equal to or greater than 0.05 µm and equal to or less than 5 µm.

(2) The optical lens according to (1), in which a ratio of a total area of the concave mark within the effective optical lens surface of the lens section to an area of the effective optical lens surface is equal to or less than 1.2%.

(3) The optical lens according to (1) or (2), in which a plurality of the concave marks is formed along lines which are equidistant from an optical axis of the lens section when the optical axis is set as a center of the lines.

(4) The optical lens according to (1) or (2), in which the concave mark is formed along a simple closed curve that encloses the optical axis of the lens section.

(5) The optical lens according to (4), in which the concave mark is formed along a circumference of a circle centered on the optical axis.

(6) The optical lens according to (5), in which a plurality of the concave marks is formed along a circumference of a circle centered on the optical axis.

(7) The optical lens according to (6), in which the concave marks are equidistantly formed along the circumference of the circle centered on the optical axis.

(8) The optical lens according to any one of (1) to (7), in which the concave marks are formed along a plurality of concentric circles centered on the optical axis.

(9) The optical lens according to any one of (1) to (8), in which a width of the concave mark is equal to or greater than 0.05 µm and equal to or less than 14 µm, and in which a depth of recession of the concave mark is equal to or greater than 0.05 µm and equal to or less than 5 µm.

(10) The optical lens according to any one of (1) to (9), in which the lens section is an aspheric lens.

(11) The optical lens according to any one of (1) to (10), in which the lens section is a meniscus lens, and in which the concave mark is formed on each of both lens surfaces of the lens section.

(12) A lens unit, in which at least one or more optical lenses according to any one of (1) to (11) are held by a lens holder.

(13) An imaging module including: the lens unit according to (12), and an imaging section that captures an image of a subject through the lens unit.

(14) An electronic device, in which the image-capturing module according to (13) is mounted.

(15) The electronic device according to (14), in which the electronic device is an on-board camera.

(16) The electronic device according to (14), in which the electronic device is a digital camera.

(17) An optical lens production method for molding an optical lens by using a lens mold with a transcriptional surface having a lens shape, in which the lens mold has a convex transcriptional section which is formed to protrude from the transcriptional surface having the lens shape toward the outside, in which an optical lens, which has a concave mark recessed on a surface of the lens section in an effective optical lens surface contributing to image forming of the lens section, is molded by the convex transcriptional section, in which a width of the concave mark is equal to or greater than 0.05 µm and equal to or less than 14 µm, and in which a depth of recession of the concave mark is equal to or greater than 0.05 µm and equal to or less than 5 µm.

(18) The lens mold used in the optical lens production method according to (17).

(19) A shape correction method for the lens mold according to (18), the method including: molding an optical lens, which has the concave mark, by using the lens mold which is produced on the basis of lens shape design data indicating a prescribed lens surface shape; acquiring measured surface shape data, which indicates a lens surface shape of the optical lens, by detecting a position of the concave mark of the optical lens which is molded; acquiring differential data, which is for matching a surface shape of the optical lens with a surface shape based on the lens shape design data, by comparing the measured surface shape data with the lens shape design data; and producing the lens module on the basis of lens shape correction data which is obtained by correcting the lens shape design data on the basis of the differential data.

EXPLANATION OF REFERENCES

11: optical lens
13: upper mold
15: lower mold
21, 23: lens transcriptional section
25, 27, 29, 31: convex transcriptional section
33, 35, 37, 39: concave mark
100: lens mold
200: imaging module
210: lens unit
220: imaging device
230: imaging section
A1: lens section
Ax: optical axis

What is claimed is:

1. An optical lens comprising a lens section with a refractive power, wherein the lens section comprises one or more effective optical lens surfaces which contributes to image forming of the lens section, and a plurality of smoothly curved first concave marks and a smoothly curved second concave mark, which are formed to be recessed on one or more surfaces of the lens section, are provided in the one or more effective optical lens surfaces, wherein a width of each of the first and second concave marks is equal to or greater than 0.05 µm and equal to or less than 14 µm, wherein a depth of recession of each of the first and second concave marks is equal to or greater than 0.05 µm and equal to or less than 5 µm, and wherein at least one of the first concave marks is formed along a simple closed curve that encloses the optical axis of the lens section, and the second concave mark is formed on the optical axis.

2. The optical lens according to claim 1, wherein a ratio of a total area of the first and second concave marks within the effective optical lens surface of the lens section to an area of the effective optical lens surface is equal to or less than 1.2%.

3. The optical lens according to claim 1, wherein each of the first concave marks is formed along a curved line with all points on the curved line equidistant from an optical axis of the lens section when the optical axis is set as a center of the curved lines.

4. The optical lens according to claim 1, wherein the first concave marks are formed spaced apart from each other along a circumference of a circle centered on the optical axis.

5. The optical lens according to claim 4, wherein the first concave marks are spaced apart equidistantly with respect to each other along a circumference of a circle centered on the optical axis.

6. The optical lens according to claim 1, wherein the lens section is an aspheric lens.

7. The optical lens according to claim 1, wherein the lens section is a meniscus lens, and wherein at least one of the first and second concave marks is located on a first lens surface of the lens section, and at least another one of the first and second concave marks is located on a second lens surface of the lens section.

8. A lens unit, wherein at least one or more of the optical lenses according to claim 1 are held by a lens holder.

9. An imaging module comprising: the lens unit according to claim 8; and an imaging section that captures an image of a subject through the lens unit.

10. An electronic device, wherein the imaging module according to claim 9 is mounted.

11. The electronic device according to claim 10, wherein the electronic device is an on-board camera.

12. The electronic device according to claim 10, wherein the electronic device is a digital camera.

13. An optical lens production method for molding an optical lens according to claim 1 by using a lens mold with a transcriptional surface having a lens shape, wherein the lens mold has a convex transcriptional section which is formed to protrude from the transcriptional surface having the lens shape toward the outside, wherein an optical lens surface of the optical lens is molded by the transcriptional surface, and the first and second concave marks are molded by the convex transcriptional section, wherein a width of each of the first and second concave marks is equal to or greater than 0.05 µm and equal to or less than 14 µm, wherein a depth of recession of each of the first and second concave marks is equal to or greater than 0.05 µm and equal to or less than 5 µm, and at least one of the first concave marks is formed along a simple closed curve that encloses the optical axis of the lens section, and the second concave mark is formed on the optical axis.

14. The lens mold used in the optical lens production method according to claim 13.

15. A shape correction method for a lens mold, wherein the lens mold comprises a transcriptional surface having a lens shape, wherein the lens mold has a convex transcriptional section which is formed to protrude from the transcriptional surface having the lens shape toward the outside, the method comprising:

molding the optical lens of claim 1, which has the second concave mark and the plurality of first concave marks, by using the lens mold which is produced on the basis of lens shape design data indicating a prescribed lens surface shape;

acquiring measured surface shape data, which indicates a lens surface shape of the optical lens, by detecting positions of the second concave mark and positions of the plurality of first concave marks of the optical lens which is molded;

acquiring differential data, which is for matching a surface shape of the optical lens with a surface shape based on the lens shape design data, by comparing the measured surface shape data with the lens shape design data; and producing a lens module on the basis of lens shape correction data which is obtained by correcting the lens shape design data on the basis of the differential data.

* * * * *